United States Patent
Van Houdenhoven et al.

(10) Patent No.: US 6,232,093 B1
(45) Date of Patent: May 15, 2001

(54) PROCESS FOR THE PRODUCTION OF HEPARIN

(75) Inventors: Francois Egbert Abraham Van Houdenhoven, 's-Heesch; Adrianus Lambertus Maria Sanders, Uden; Petrus Johannes Josephus Van Zuthpen, Veghel, all of (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/462,223

(22) PCT Filed: Jul. 9, 1998

(86) PCT No.: PCT/EP98/04939
§ 371 Date: Jan. 3, 2000
§ 102(e) Date: Jan. 3, 2000

(87) PCT Pub. No.: WO99/03893
PCT Pub. Date: Jan. 28, 1999

(30) Foreign Application Priority Data

Jul. 16, 1997 (EP) .................................................. 97202213

(51) Int. Cl.⁷ ............................. C12P 21/06; C08B 37/10
(52) U.S. Cl. ............................................. 435/68.1; 536/21
(58) Field of Search .......................... 424/520; 435/68.1, 435/262, 101; 514/2; 536/56, 21

(56) References Cited

U.S. PATENT DOCUMENTS 4,216,293  8/1980  Fedeli .
5,607,840  * 3/1997  Van Gorp et al. .................. 435/68.1

FOREIGN PATENT DOCUMENTS 0 421 508    4/1991  (EP) .
2 045 271   10/1980  (GB) .
WO 94 12524  6/1994  (WO) .

OTHER PUBLICATIONS

Griffin et al., *Carbohydrate Research*, 276:183–197 (1995).

* cited by examiner

Primary Examiner—Jon P. Weber
Assistant Examiner—Patricia Patten
(74) Attorney, Agent, or Firm—William M. Blackstone

(57) ABSTRACT

The invention relates to a simplified process for the extraction of heparin from animal mucosa tissue. The method consists of an enzymatic hydrolysis step of the raw material at ambient temperature, followed by hydrolysis for up to 6 hours at a temperature of 50–75° C. Raise in temperature is obtained by easy means. The digestion mixture can be further incubated while cooling down to ambient temperature. Heparin is recovered from anion exchanger present in the protein hydrolysate.

8 Claims, No Drawings

PROCESS FOR THE PRODUCTION OF HEPARIN

FIELD OF THE INVENTION

The present invention relates to the preparation of heparin. More particularly, it relates to a simplified process for the removal of proteins present in an animal tissue source of heparin

BACKGROUND OF THE INVENTION

Heparin is a very complicated glycosaminoglycan composed of alternating sequences of differently sulfated residues of uronic acid and α-D-glucosamine linked by α and β (1–4) bonds. Due to the complexity of its primary structure, heparin is a polydisperse heteropolysaccharide which is strongly heterogeneous in terms of molecular weight, physico-chemical properties and biological activities.

Heparin has been used for already a long time as an anticoagulant and antithrombotic agent in the treatment and prevention of venous thrombosis. It is present in a variety of animal tissues and may be obtained by isolation therefrom. Currently a large part of the heparin used for these purposes is isolated from porcine intestinal mucosa. The isolation process involves hydrolysis of the mucosa followed by extraction of the heparin.

U.S. Pat. No. 5,607,840, hereby included by reference, describes a process for hydrolysis of mucosa tissue. The method involves hydrolysis of an aqueous mixture containing mammalian mucosa with a proteolytic enzyme at a temperature of about 55° C., adsorption of polyanions to an anion exchange resin and subsequent recovery of the anions from the resin and the protein hydrolysate from the digested aqueous solution. In order to stabilize the raw mucosa material and to prevent bacterial growth, salts in the form of an oxygen scavenger or bacteriocides are introduced into the solution.

The heparin content in the mucosa-containing aqueous medium is very low and consequently large amounts of mucosa tissue have to be processed. Therefore, for economic reasons, the hydrolysis process is carried out in reaction vessels of more than 50 m$^3$. During the reaction time the temperature is kept at a constant level for more than 24 hours and the mixture is stirred vigorously using advanced equipment.

Usually heparin extraction plants are not located at a short distance from the slaughterhouses where the mucosa is collected and transportation over long distances is required. Especially in remote areas this results in a delivery of low quality material at the production plant and an increase of costs.

SUMMARY OF THE INVENTION

The present invention provides a new and easy way of isolating heparin from mucosa tissue. It has been found that protein in an aqueous mixture comprising mammalian mucosa tissue can also be digested with a proteolytic enzyme at a temperature between 50–75° C. for up to approximately 6 hours. A simple "pre-hydrolysis" step at ambient temperature can optionally be included. This was shown to improve the efficiency of the proteolysis significantly. After the raise in temperature hydrolysis can be continued preferably in the presence of polyanion adsorbent material at a temperature below 50° C. The digestion can be carried out in containers with intermediate capacity.

DETAILED DESCRIPTION OF THE INVENTION

Thus, the process according to the invention comprises the step of raising the temperature of the mucosa to approximately 50–75° C. and incubating the mucosa within that temperature range for up to approximately 6 hours in the presence of a proteolytic enzyme.

The process has the advantage that it can be carried out at a relatively small scale. The process is very well suited to be carried out at places where the raw mucosa material is produced and thus no transportation of raw material is needed. Furthermore, no special skills are required.

According to the present invention also one or both of the following incubation steps can be included in the method:

a) incubating the mixture in a container for up to approximately 8 hours at ambient temperature prior to the temperature raise b) further incubating after the raise in temperature whilst the solution is allowed to cool down to ambient temperature.

The incubation time at 50–75° C. preferably is less than 4 hours. Preferably the incubation time is more than 1 hour. The temperature is raised preferably to approximately 60–70° C.

The temperature can easily be raised by direct heating of the container containing the aqueous mucosa solution. For example, a temperature of about 60–70° C. can be reached rapidly with an ordinary gas flame but also e.g. by the addition of steam. The thus obtained temperature can be maintained by moderate heating for several hours. Alternatively, external addition of heat can be stopped as soon as the desired temperature is reached allowing the mixture in the container to cool down gradually. Because of the gradual temperature decrease, the mixture will retain its temperature above 50° C. for several hours. Thus, initially protein hydrolysis occurs at a temperature above 50° C. After removal of the external heat source, temperature decreases and hydrolysis continues at a lower temperature. There is no limitation to the extent of incubation time at the decreased temperature, however, incubation times of less than 24 hours are to be preferred, more preferably the incubation is carried out over night. Continuation of a prolonged incubation at ambient temperature is not a prerequisite but it was shown to have influence on the heparin yield. Similarly the "pre incubation" step at ambient temperature was shown to improve heparin yields.

The reaction vessel can e.g. be a steel container but no specific requirements are needed.

Alternatively, the temperature can be raised by the addition of 1–3 volumes of an aqueous solution with a temperature between 80 and 100° C. Preferably water is used but also dilute salt solutions can be used. Preferably, the temperature of the water is the boiling temperature. Due to the volume enlargement the heat capacity increases. Therefore the temperature can be maintained at the desired temperature for a sufficiently long period of time whereas simultaneously the cooling down process progresses slowly. An additional advantage of the addition of water is that the viscosity of the solution is reduced resulting in a better sievability of the adsorbent-heparin complex which is important in the extraction of heparin. As no direct heating is required containers from different materials e.g. plastic can be used.

A convenient way of carrying out the procedure according to the invention is to collect the mucosa during a working day and to start with hydrolysis by the addition of proteolytic enzyme during storage of the raw material in a container. At the end of the day the temperature can be increased to 50–75° C., optionally kept at a constant level for a few hours, and then further incubated over night whilst the temperature decreases gradually to ambient temperature.

It is to be preferred that during the hydrolysis process the mixture is stirred in order to obtain a homogeneous solution and to have a good contact between the adsorbent and the heparin-containing solution.

The mucosa-containing solution can be obtained by dispersing animal tissues in water. Tissues can be obtained from e.g. beef, dog, hog and sheep. The tissues have endothelial or mucosal components. Heparin is present e.g. in lung, intestine, skin and liver from a variety of animals. Preferably, intestinal mucosa from porcine origin is used.

A great variety of enzymes may be employed in the process provided that they possess a proteolytic activity. Suitable enzymes are well known in the art, e.g. microbial protease's, trypsin, chymotrypsin. A suitable enzyme for use in alkaline hydrolysis is commercially available under the trademark maxatase®. The enzyme to substrate ratio usually is approximately 0.02–0.2%. The preservative normally present in the mucosa tissue solution can also be added in the process according to the present invention. Preferably as a preservative sodium metabisulfite is used but also other preservatives such as e.g. calcium propionate or phenol will suffice. The amount of bisulfite to be added is approximately 0.5–5 kg/100 liters of mucosa. The preservative is best added during the collection of the mucosa tissue.

The pH can be adjusted to pH 7–9 with an alkaline reagent. Usually sodium hydroxide is added in an amount of approximately 0.8–1.2 kg/100 liters of mucosa. Most commonly used proteolytic enzymes exert their optimal activity at this pH. Adjustment can occur during the "prehydrolysis" step as well as during the incubation step at the higher temperature.

It is also an object of the present invention to provide a process for the isolation of heparin. The hydrolysis process of the present invention is important in the isolation of heparin. Heparin can be extracted from the hydrolysate if adsorbent is added to the mixture during one or more of the incubation steps to bind the heparin present in the hydrolyzing solution. Preferably the adsorbent is added at the beginning of the incubation at the higher temperature.

The adsorbent preferably is an anion exchange resin which is added in an amount sufficient to bind the polyanions present in the mucosa solution. Such anion exchange resins are commercially available. Usually an amount of 2 liter per 100 liter of mucosa is added. Also an affinity adsorbent specific for heparin might be used to extract heparin from the digest solution.

The total salt concentration of the hydrolysate should be selected within a range to insure almost quantitative uptake by the resin important for the efficiency of binding of the polyanions to the ion exchange resin and usually varies between 0.1 and 0.5 molar. In addition to the salts present in the mucosa, usually also preservatives and alkali metal salts or ammonium salts are added during the hydrolysis process.

After the hydrolysis process the adsorbent is sieved off. The adsorbed heparin is then eluted by a high salt solution and the heparin is further processed. Thus, it is also an object of the present invention to provide a process for the isolation of heparin which comprises the further steps of sieving off the adsorbent with the heparin and elution of the heparin from the adsorbent.

To insure optimum recovery of heparin, it is desirable that the salt solution used for elution is of sufficiently high ionic strength to insure substantially complete release of heparin from the adsorbent. One way of recovery of the heparin from the heparin-anion exchange complex is elution with NaCl at a concentration of 2–4 molar.

It will be clear that the procedure according to the invention makes it possible to process the non adsorbed material i.e. the mucosa at the site where it is produced since the procedure is easy to perform and only a minimal equipment is required to perform the hydrolysis. Therefore, the process according to the present invention can be carried out even in a low tech environment with poor infrastructure.

The following examples are illustrative for the invention and should in no way be interpreted as limiting the scope of the invention.

EXAMPLES

Example 1

To 250 kg of porcine mucosa, stabilized with 0.5% sodiummetabisulfite, 200 grams of maxatase® was added and the mixture was stirred at ambient temperature. After 4 hours the mucosa was heated to 69° C. with a gas flame heater in about 70 minutes. NaOH was added (1500 grams) resulting in a pH of 7.3 and 3.5 liters of anion exchanger were added. The mixture was then left to cool off overnight while stirring. To facilitate the separation of the ion exchanger, the mixture was heated the next day prior to sieving off the ion exchanger. The ion exchanger was washed with a 3.5% salt solution and eluted with a 14% salt elution. The eluted heparin was precipitated with methanol. The heparin yield was 36100 U/kg mucosa in the eluate and 34300 U/kg in the precipitate. The activity and quality were comparable with heparin crude derived from a standard process.

Example 2

To 100 kg of porcine mucosa, stabilized with 1% sodiummetabisulfite, 80 grams of maxatase® was added and the mixture was stirred at ambient temperature. After 2 hours the mucosa was heated to 65° C. by the addition of 120 liters of boiling hot water in about 10 minutes. The pH was changed by adding 630 ml of a 33% NaOH solution (measured value 7.3) and 3.5 liters of anion exchanger were added. The starting temperature was 65° C., after one hour this was 61° C., after two hours 56 and after three hours 52° C. The mixture was left to cool off overnight. The ion exchanger was sieved off at a temperature of 28° C. and the washed ion exchanger was eluted. The heparin yield was 30500 U/kg mucosa in the eluate and 26400 U/kg in the precipitate. The activity and quality were comparable with heparin crude derived from a standard process.

Example 3

To 47.5 kg mucosa stabilized with 0.5% sodium metabisulfite, 80 grams maxatase® was added at a temperature of 30° C. while stirring. After 4 hr. another 55.5 kg of mucosa was added and the mixture was stirred for another 2 hr. at ambient temperature (26° C.). Then the mixture was heated in 40 minutes to 65° C. by introducing hot steam into the mixture. The pH was changed to 7.2 with 550 grams NaOH and after stirring for one hour one liter of ion exchanger was added. The starting temperature was 65° C., after one hour this was 62° C., and after two hours 53° C. The mixture was left to cool off overnight, the temperature was 27° C. Heparin yield was 40000 U/kg in the eluate and 38700 U/kg in the precipitate.

Example 4

To 3 kg of porcine mucosa in an insulated flask, stabilized with 0.5% sodiummetabisulfite, 2.3 grams of maxatase® were added and the mixture was stirred at ambient temperature. After 5.5 hours at 30° C. the mucosa was heated to 64° C. by the addition of 5.4 liters of boiling hot water. 35 ml of a 33% NaOH solution was added resulting in a pH of 7.6 and 110 ml of anion exchanger was added. Then the mixture was left to cool off. After approx. 16 hr. the temperature was 41° C. and the ion exchanger was sieved off. Heparin yield in the eluate was 32200 U/kg mucosa. The activity and quality were comparable with heparin crude derived from a standard process.

Example 5

To 115 kg of porcine mucosa, stabilized with 1% sodiummetabisulfite, 88 grams of maxatase® was added and the mixture was stirred at ambient temperature. After 2 hours the mucosa was heated to 65° C. by the addition of 133 liters of boiling hot water in about 10 minutes. The pH was changed by adding 880 grams of NaOH (pH 7.75) and 4 liters of anion exchanger was added. Subsequently 108 grams of maxatase® was added. The starting temperature was 65° C., after one hour this was 60° C., after two hours 57 and after three hr. 54° C. After 3 hours the ion exchanger was sieved off. The washed ion exchanger was eluted and the heparin was precipitated. The heparin eluate contained 20500 U/kg mucosa and the precipitate 17565 U/kg. The activity and quality were comparable with heparin crude derived from a standard process.

Example 6

To 100 kg of porcine mucosa, stabilized with 1% sodiummetabisulfite, maxatase® was added and the mixture was stirred at ambient temperature. Then the mucosa was heated to 68° C. with a gas flame heater in 60 minutes. NaOH was added resulting in a pH of 7.2. Thereafter 2.1 liters of anion exchanger was added. The mixture was then left to cool off until the temperature came below 60° C., then additional heating was applied to keep the temperature above 60° C. After three hours the ion exchanger was sieved off. The ion exchanger was washed and stored at 5° C. for transport to the processing plant.

What is claimed is:

1. A method for producing heparin from mammalian mucosa tissue, comprising adding a proteolytic enzyme to mucosa tissue; mixing the enzyme and mucosa tissue at ambient temperature for 2 to 8 hours; raising the temperature of the mixture to approximately 50–75° C.; and incubating the mixture within that temperature range for approximately 1 to 6 hours and further recovering said heparin.

2. The method according to claim 1, wherein the incubation time at approximately 50–75° C. is from 1 to 4 hours.

3. The method according to claim 1, wherein the temperature is raised to approximately 60–70° C. for incubation.

4. The method of claim 1, wherein after the raised temperature incubation the mixture is allowed to cool to ambient temperature.

5. The method according to claim 1, wherein the rise in temperature is obtained by the addition of 1–3 volumes of an aqueous solvent with a temperature of between 80–100° C. to the mixture comprising the mucosa tissue and proteolytic enzyme.

6. The method according to claim 5, wherein the aqueous solvent is boiling water within said temperature range of 80–100° C.

7. The method according to claim 1, wherein in the recovery step an adsorbent in an amount sufficient to bind the heparin present in the mixture is added to the mixture any time after raising the temperature of the mixture.

8. The method according to claim 7, which further comprises sieving off the adsorbent with the heparin and recovering the heparin from the adsorbent.

\* \* \* \* \*

UNITED STATES PATENT AND TRADEMARK OFFICE
CERTIFICATE OF CORRECTION

PATENT NO. : 6,232,093 B1
DATED : May 15, 2001
INVENTOR(S) : Van Houdenhoven et al.

It is certified that error appears in the above-identified patent and that said Letters Patent is hereby corrected as shown below:

Title page,
Inventors, please correct the last named inventor, by replacing "Zuthpen" with -- Zutphen --.

Signed and Sealed this

Eighth Day of January, 2002

Attest:

Attesting Officer

JAMES E. ROGAN
Director of the United States Patent and Trademark Office